United States Patent [19]

Saul

[11] Patent Number: 5,230,086
[45] Date of Patent: Jul. 20, 1993

[54] NARROW BAND COMMUNICATION SYSTEM

[75] Inventor: Peter H. Saul, Towcester, United Kingdom

[73] Assignee: Plessey Semiconductors Limited, Swindon, England

[21] Appl. No.: 470,611

[22] Filed: Jan. 29, 1990

[30] Foreign Application Priority Data

Feb. 4, 1989 [GB] United Kingdom ............... 8902535

[51] Int. Cl.$^5$ ..................... H04B 7/00; H04B 1/26
[52] U.S. Cl. .................................. 455/51.1; 455/71; 455/88; 455/318
[58] Field of Search ............... 455/47, 51, 71, 86–88, 455/103, 105, 313, 318, 180.2, 188.2, 51.1

[56] References Cited

U.S. PATENT DOCUMENTS

| | | |
|---|---|---|
| 3,683,279 | 8/1972 | Weinberg et al. .................. 455/71 |
| 3,778,716 | 12/1973 | Stokes ................................ 455/47 |
| 3,942,115 | 3/1976 | Wolejsza et al. .................. 455/71 |
| 4,442,527 | 4/1984 | Munday .............................. 455/71 |
| 4,618,996 | 10/1986 | Rafal et al. ........................ 455/71 |
| 4,761,821 | 8/1988 | Mawhinney et al. ............. 455/103 |

*Primary Examiner*—Reinhard J. Eisenzopf
*Assistant Examiner*—Andrew Faile
*Attorney, Agent, or Firm*—Jacobson, Price, Holman & Stern

[57] ABSTRACT

A narrow band modulation UHF/Microwave communication system comprises a transmit/receive base station having a plurality of transmitter for transmitting information at respective UHF/Microwave channel frequencies to a plurality of remote transmit/receive stations, in which the transmitters at the base station are served in common by a single master oscillator and in which a single reference frequency signal is derived from the master oscillator at the base station and transmitted to all of said remote stations where it serves to provide for frequency locking of the oscillators at said stations to produce synchronization between the frequencies at the base station and the remote stations.

4 Claims, 3 Drawing Sheets

NARROW BAND COMMUNICATION SYSTEM

This invention relates to communication systems and relates more specifically to such systems utilising narrow band modulation techniques at UHF/Microwave frequencies.

The present invention is directed to a more efficient use of the frequency spectrum embracing the frequencies utilised in the above systems.

BACKGROUND OF THE INVENTION

Conventional UHF radio systems universally use frequency modulation (FM) for speech transmission purposes and frequency or phase shift keying (FSK or PSK) for the transmission of other data. Frequency channel spacing in such systems at frequencies above 300 MHz is usually at least 25 KHz, the actual spacing being dictated by the stability requirements for the local receiver and transmitter oscillators. The system must remain operative within an acceptable tolerance of the nominal channel frequency for a range of different supply voltages, temperatures and over a predetermined time from the initial setting of the transmitter/receiver. Although some retuning of the transmitter/receiver has been acceptable in the past, nowadays it is highly desirable that the equipment remains on frequency for life (e.g. five years). Some exemplary figures illustrating the problem of frequency shift in UHF radio systems are as follows: (a) If a total acceptable shift for frequency modulation (FM) or frequency shift keying (FSK) operation is 1 KHz and the transmission frequency is 1 GHz then the total frequency shift from all causes over a period of 5 years will be one part in one million. This represents the frequency shift limit achievable with good quality crystals for frequency control.

When it is further realised that this very small frequency shift limit must also include the transmit/receive station offsets and spread between equipments the shift limit is clearly very stringent. Consequently, more bandwidth efficient systems such as very narrow band multi-channel FM (e.g. channel spacing of 12.5 KHz or 6.25 KHz) systems would likely be impractical and single sideband systems which require even better stability would definitely not be possible. There is no real prospect of significant improvement in frequency control crystal stability and although more expensive control crystals are more stable their stability is improved only by a very small factor.

SUMMARY OF THE INVENTION

The present invention seeks to overcome all of these crystal stability problems at only small cost and the invention is applicable to narrow band frequency modulation and frequency shift keying systems as well as true single sideband systems occupying the minimum possible bandwidth.

According to the present invention there is provided a narrow band modulation UHF/Microwave communication system comprising a transmit/receive base station having a plurality of transmitters for transmitting information (i.e. speech or other data) at respective UHF/Microwave channel frequencies to a plurality of remote transmit/receive stations, in which the transmitters at the base station are served in common by a single master oscillator and in which a single reference frequency signal is derived from the master oscillator at the base station and transmitted to all of said remote stations where it serves to provide for frequency locking of the oscillators at said stations to produce synchronisation between the frequencies at the base station and the remote stations.

The oscillators at the remote stations may include oscillators for the generation of signal frequencies for the transmission of information to the base station.

In carrying out the present invention the reference frequency signal will be well spaced from the closest transmission channel frequencies by so-called guard bands.

BRIEF DESCRIPTION OF THE DRAWINGS

By way of example the present invention will now be described with reference to the accompanying drawings in which.

DESCRIPTION OF THE PREFERRED EMBODIMENT

Figure 1:
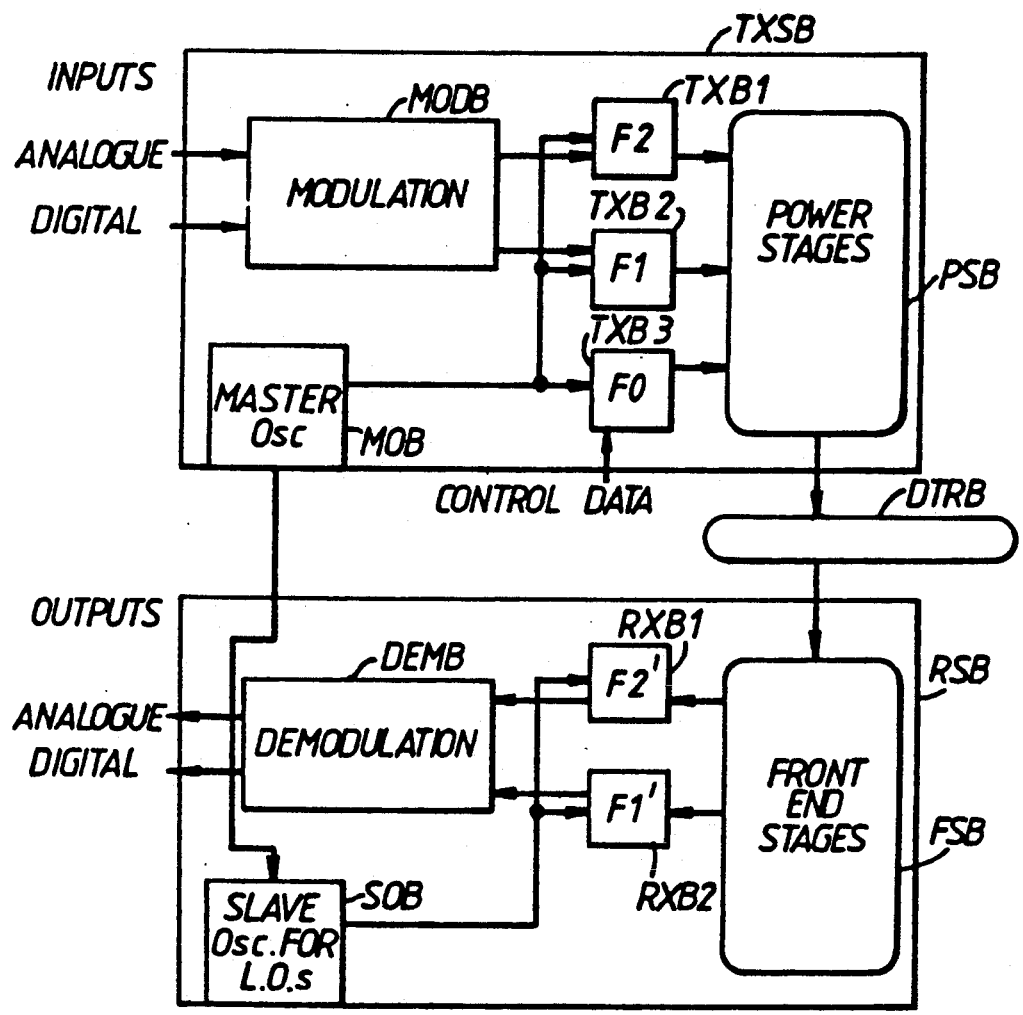
FIG. 1 shows a block schematic diagram of a transmitter/receiver base station in a UHF/Microwave communication system.
Figure 2:
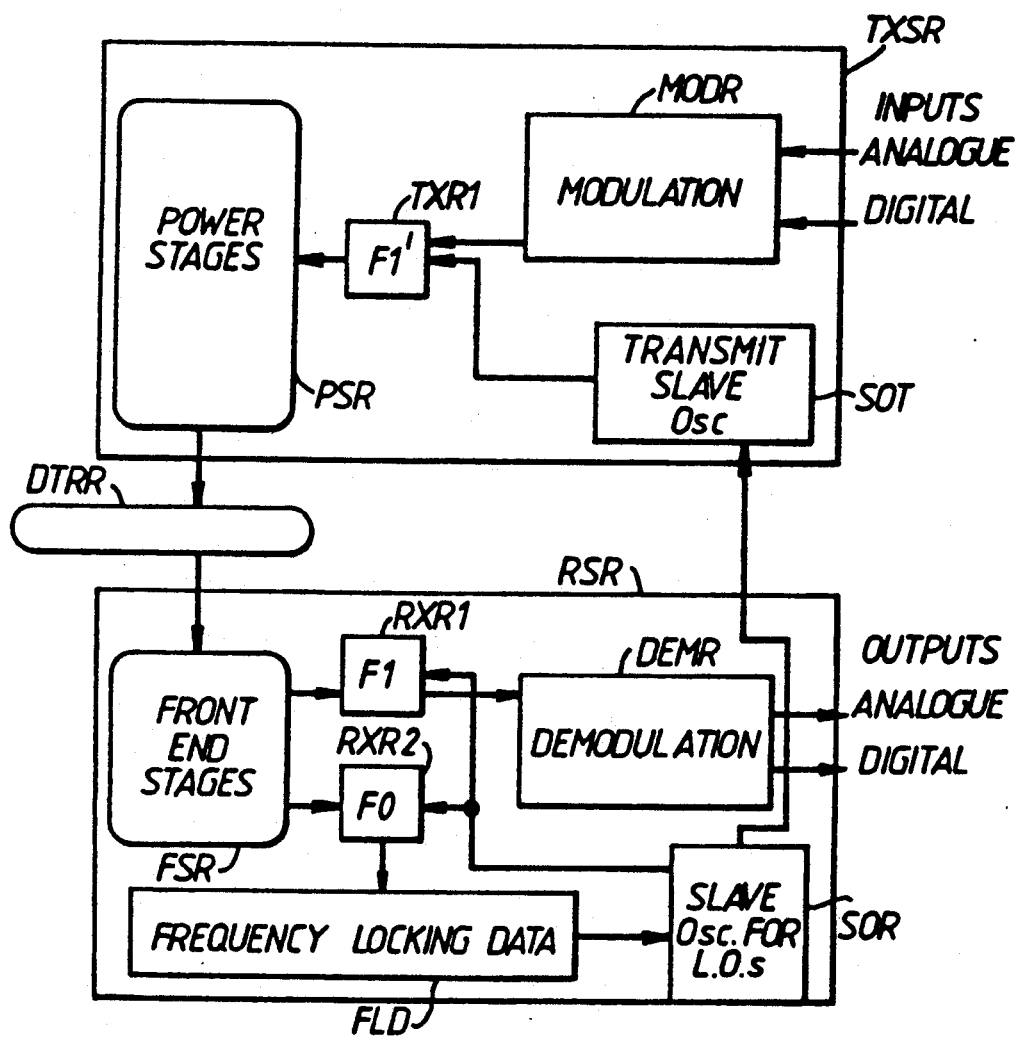
FIG. 2 shows a block schematic diagram of one of a number of transmitter/receiver remote (e.g. mobile) stations of the communication system and operatively associated with the base station of FIG. 1; and, FIG. 3 is a frequency spectrum diagram in respect of the system depicted in FIGS. 1 and 2.

Referring to FIG. 1 of the drawings, the base station illustrated comprises a transmitter section TXSB which embodies a plurality of transmitters, such as the transmitters TXB1 and TXB2 in the present example, for transmitting signals at UHF or Microwave frequencies in closely spaced frequency channels (e.g. channel spacing of 12.5 KHz or 6.25 KHz) to respective remote (e.g. mobile) stations, such a the remote station depicted in FIG. 2 of the drawings. The information of data to be transmitted to the remote station from the base station will be fed in analogue and/or digital form to a signal modulator circuit MODB which produces output signals for modulating the UHF/Microwave frequency signals of frequency F1 and F2 produced by the transmitters TXB1 and TXB2. The signal frequencies F1 and F2 produced by the transmitters TXB1 and TXB2 may be synthesised or otherwise produced as multiples (or divisions) of the output from a master crystal oscillator MOB. The frequencies F1 and F2 may be of the order of 1 GHz having a narrow channel spacing of 12.5 or 6.25 KHz for example.

The duly modulated UHF signals of frequencies F1 and F2 after being fed through power amplifying stages PSB are applied to a diplexer and transmitter/receiver antenna structure DTRB.

In the present example the modulated signal of frequency F1 will be received by the receiver section RSR of the remote station shown in FIG. 2. The modulated signal of frequency F1 will be received via a diplexer transmitter/receiver antenna arrangement DTRR after which the signal will be detected and amplified by the front end stage FSR of the receiver section RSR. The output from the stage FSR is fed to a receiver RXR1 including a local oscillator having the same frequency F1 as the carrier wave of the received signal. The output from the receiver RXR1 is then applied to a demodulator DEMR which produces data output in analogue and/or digital form.

In accordance with the principle of the present invention the frequency F1 of the local oscillator output of the receiver RXR1 is controlled by a slave oscillator SOR which in turn is controlled either continuously or periodically, as appropriate, in accordance with frequency locking data stored in a digital data storage device FLD.

At this juncture it is convenient to revert to FIG. 1 of the drawings from which it will be seen that the transmitter section TXSB of the base station includes in addition to the transmitters TXB1 and TXB2 a third transmitter TXB3 which is also controlled by the master oscillator MOB and which produces a signal of frequency F0.

Figure 3:
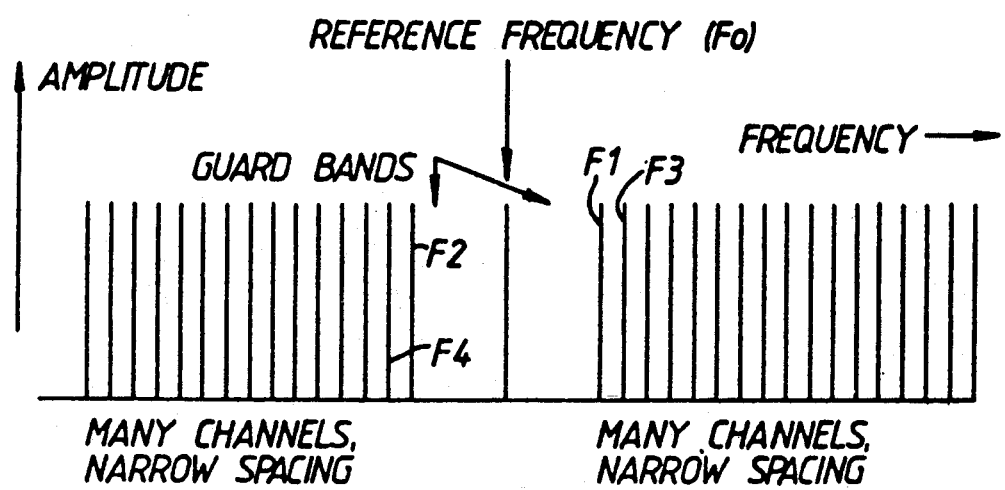

The frequency F0 is shown on the frequency spectrum diagram of FIG. 3 and, as can be seen, it is well separated from the other channel frequencies, such as the frequencies F1 and F2, which have narrow frequency spacing (e.g. 6.25 KHz) relative to adjacent channels (e.g. F3 and F4). The frequency bands between the frequency F0 and the nearest channel frequencies (e.g. frequencies F1 and F2) are conveniently referred to as guard bands and serve to ensure frequency looking of the oscillators at the remote stations on to the master oscillator at the base station.

The signal of reference frequency F0 produced by the transmitter TXB3 is not modulated for the transmission of data to remote stations but is transmitted in response to control signals applied to the transmitter for the purpose of synchronisation at all of the remote stations to and from which the base station transmits/receives data.

In the case of the remote station shown in FIG. 2 the signal frequency F0 (i.e. reference frequency) is received by the receiver RXR2 after being amplified etc. by the received front end stage FSR. The frequency of the local oscillator of the receiver RXR2 is controlled by the slave oscillator SOR for the receivers RXR1 and RXR2. The frequency of the slave oscillator SOR is in turn controlled by frequency locking data device FLD for the receiver RXR2 thereby achieving frequency locking of the slave oscillator SOR relative to the master crystal oscillator MOB in the base station transmitter section TXSB. In this way the expected normal drift in the frequency F0 of the master oscillator over a period of time will not adversely affect the operation of the system. The slave oscillator SOR in the receiver section RSR of the remote station which is controlled by the frequency locking data stored in the store FLD also controls the frequency of a transmit slave oscillator SOT in a transmitter section TXSR of the remote station. The transmit slave oscillator SOT controls the frequency F1$^1$ of signals produced by the transmitter TXR1 and modulated by the output from a modulator MODR in response to an analogue and/or digital data input. The control of the frequency F1$^1$ may be achieved through a local oscillator or synthesiser multiple/division of the slave oscillator output from the oscillator SOT. These modulated transmitted signals are fed through power stages PSR to the diplexer transmit/receive antenna arrangement DTRR.

At the base station these modulated signals of carrier frequency F1$^1$ are received by the diplexer transmit/receive antenna arrangement DTRB and fed to the front end stages FSB of receiver section RSB which includes two receivers RXB1 and RXB2. Both of these receivers have local oscillators associated therewith which are controlled by a slave oscillator SOB which in turn has a frequency controlled by the master oscillator MOB. Thus, any drift in the frequency F1$^1$ due to drift in the frequency F0 of the master oscillator MOB will be compensated for in the transmitter section of the remote station and in the receiver section of the base station. The output from the receiver RXB2 is demodulated by a demodulator DEMB from which an analogue and/or digital data output is derived. The other receiver RXB1 will receive incoming signals of frequency F2$^1$ from a different remote station (not shown) which will also be synchronised with the master oscillator frequency by means of the reference frequency signal of frequency F0 transmitted either continuously or periodically by the base station as hereinbefore described.

As previously mentioned the reference frequency signal F0 for achieving synchronisation between the base station equipment and the remote stations may be continuous or it may be transmitted at periodic intervals. In this connection, amateur radio practice where single sideband operation at 1296 MHz is quite commonplace would suggest that even for a single sideband system in accordance with the present invention using low cost crystals re-tuning would only need to be performed at intervals of minutes or tens of minutes. However, in the system now being proposed re-tuning is entirely automatic and transparent to the user. As regards the addition of the reference frequency control receiver at the remote stations the additional equipment required is minimal and as far as the use of the frequency locking data storage and frequency locking loop at the receiver of the remote station is concerned, this represents a very small overhead in chip area and power terms and moreover allows cheap crystals to be used, the only requirement being that the crystals are capable of achieving the initial lock on to the transmitted reference frequency F0. The guard banding previously referred to will ensure that this in fact is accomplished. In practice, a microprocessor control scanned routine across the nominal and guard frequencies will achieve lock-up at first switch on within milliseconds. Problems of alternative schemes such as "pilot-tone" single side band or "transparent tone in band" (TTIB) are avoided. Problems such as selective fading are unlikely to occur in the system now proposed since update data will only be required infrequently and where this data is now available old data can be used until the lock is re-acquired.

What is claimed is:

1. A narrow band modulation UHF/Microwave communication system including a transmit/receive base station and a plurality of transmit/receive remote stations, wherein said base station comprises:
  master oscillator means;
  means for generating, from an output of said master oscillator means, a plurality of carrier signals of different channel frequencies spaced apart over a band of frequencies;
  means for generating, from an output of said master oscillator means, a reference carrier signal of a frequency spaced from said band of frequencies;
  means for transmitting information, as narrow band modulation of respective ones of said different channel frequencies, to a plurality of said remote stations; and
  means for transmitting, unmodulated, said reference carrier signal to all of said remote stations, and each of said plurality of remote stations comprise:
  means for receiving at least one of said modulated channel frequencies;

means for receiving said unmodulated reference carrier signal;

a controllable frequency slave oscillator;

means for controlling the frequency of oscillation of said slave oscillator in dependence upon the frequency of said reference carrier signal;

means for demodulating said at least one modulated channel frequency with reference to an output from slave oscillator; and means for generating, from an output of said slave oscillator, at least one carrier signal at a respective one of said different channel frequencies.

2. A narrow band modulation UHF/Microwave communication system as claimed in claim 1 in which the unmodulated reference frequency signal is transmitted periodically to the plurality of remote transmit/receive stations.

3. A narrow band modulation UHF/Microwave communication system as claimed in claim 1 in which the slave oscillator at each remote station is arranged to control a further slave oscillator in the associated transmitter part of the same station.

4. A narrow band modulation UHF/Microwave communication system as claimed in claim 1, in which the master oscillator means at the base station controls at least one further oscillator in the receiver part of the base station.

* * * * *